US007435076B2

(12) United States Patent
Zoppas et al.

(10) Patent No.: US 7,435,076 B2
(45) Date of Patent: Oct. 14, 2008

(54) APPARATUS FOR THERMALLY CONDITIONING PLASTIC ITEMS

(75) Inventors: Matteo Zoppas, Fontana Fredda (IT); Alberto Armellin, Vittorio Veneto (IT)

(73) Assignee: S.I.P.A. Societa Industrializzazione Progettazione e Automazione S.p.A. (IT)

( * ) Notice: Subject to any disclaimer, the term of this patent is extended or adjusted under 35 U.S.C. 154(b) by 0 days.

(21) Appl. No.: 10/575,666

(22) PCT Filed: Oct. 14, 2004

(86) PCT No.: PCT/EP2004/052537

§ 371 (c)(1),
(2), (4) Date: Apr. 4, 2007

(87) PCT Pub. No.: WO2005/037525

PCT Pub. Date: Apr. 28, 2005

(65) Prior Publication Data

US 2007/0224307 A1     Sep. 27, 2007

(30) Foreign Application Priority Data

Oct. 15, 2003    (IT) .......................... RM2003A0475

(51) Int. Cl.
B29C 49/68    (2006.01)
(52) U.S. Cl. ...................... 425/526; 425/534

(58) Field of Classification Search ............. 425/174.4, 425/526, 534; 432/122, 123, 124; 264/454, 264/458, 535
See application file for complete search history.

(56) References Cited

U.S. PATENT DOCUMENTS

| 2,548,683 | A | * | 4/1951 | Remington et al. .......... 432/122 |
| 3,627,282 | A | | 12/1971 | Kinslow, Jr. ................... 263/8 |
| 3,741,553 | A | * | 6/1973 | Moore ......................... 432/124 |
| 3,775,524 | A | * | 11/1973 | Seefluth ....................... 264/535 |
| 3,787,170 | A | * | 1/1974 | Gilbert ......................... 425/526 |
| 3,850,573 | A | * | 11/1974 | Yoshikawa et al. .......... 432/124 |
| 3,997,642 | A | * | 12/1976 | Yoshikawa et al. .......... 425/526 |
| 4,025,294 | A | * | 5/1977 | Daane et al. .................. 432/11 |

(Continued)

FOREIGN PATENT DOCUMENTS

GB           1 497 114         1/1978

(Continued)

Primary Examiner—Robert B Davis
(74) Attorney, Agent, or Firm—Lorusso & Associates (57) ABSTRACT

The method for thermally conditioning preforms in accordance with the invention comprises the following steps:—Placing the preforms on a chain conveyor (2);—Conveying the preforms through a first thermal conditioning stage (1) and subjecting them to a first heating or cooling heat exchange;—Removing the preforms from the first thermal conditioning stage and holding them outside for a predetermined amount of time in order to redistribute the temperature inside the preforms;—Subjecting the preforms to at least a second heating or cooling heat exchange in a second thermal conditioning stage (1) or in the first thermal conditioning stage. The invention also concerns the plants for heating or cooling preforms in accordance with the above method.

12 Claims, 5 Drawing Sheets

U.S. PATENT DOCUMENTS

| | | | | |
|---|---|---|---|---|
| 4,212,841 A | * | 7/1980 | Michel | 425/534 |
| 5,066,222 A | | 11/1991 | Roos et al. | 432/5 |
| 5,308,233 A | | 5/1994 | Denis et al. | 425/151 |
| 5,326,258 A | | 7/1994 | Gittner et al. | 432/5 |
| 6,139,789 A | | 10/2000 | Neter et al. | 264/535 |
| 6,422,379 B1 | * | 7/2002 | Zoppas | 425/534 |
| 6,428,737 B1 | | 8/2002 | Collette et al. | 264/513 |
| 6,632,087 B1 | * | 10/2003 | Armellin et al. | 425/526 |
| 6,942,480 B2 | * | 9/2005 | Drysdale et al. | 425/526 |
| 7,291,811 B2 | * | 11/2007 | Evrard et al. | 264/535 |

FOREIGN PATENT DOCUMENTS

| | | | |
|---|---|---|---|
| WO | WO99/03507 | | 12/1999 |
| WO | 2004062885 A1 | * | 7/2004 |

* cited by examiner

APPARATUS FOR THERMALLY CONDITIONING PLASTIC ITEMS

TECHNICAL FIELD

This invention relates to a plant and a method for thermally conditioning plastic items such as preforms used in blow moulding processes to form bottles, pots, or other containers. More particularly, the invention relates to heating or cooling stations for preforms to be blow moulded using the so-called «cold cycle».

BACKGROUND ART

Today, the production of blow moulded containers in different shapes and sizes—for example plastic bottles, pots, or other items—using the so-called «cold cycle» involves injection, compression, or extrusion moulding preforms or parisons made of a suitable plastic—for example, PET—and, then, cooling and storing the workpiece before the blow moulding process.

To use the injection or other type of press in the most efficient way possible, the preform cooling stage in the mould is kept to a minimum by transferring the preforms, as soon as possible, to specific external cooling stations, where cooling is completed.

To accomplish this, state-of-the-art sequential cooling stations can be used. Here, the preforms are cooled by placing them into specific cooling bowl-type holders cooled by water (a sequential cooling station is described, for example, in Patent Application WO 01/54883 filed by the Applicant). Said holders are placed in groups—often forming a square or rectangular layout—on cooling plates that are used sequentially, i.e. groups of preforms are handled in sequence: a group of preforms coming out of a mould—normally, all the preforms made with a single press blow—is placed in the holders of a plate to cool them simultaneously; then, the plate is freed of the cooled preforms and the station repeats the operating cycle.

Today, no continuous cooling stations—i.e. able to handle a continuous flow of preforms coming from a continuous moulding station, such as a rotary moulding station, described, for example, in patents EP 759 844 or U.S. Pat. No. 5,071,339—are known. It is currently not convenient to pair a sequential cooling station with a continuous moulding unit, especially a high production one.

Regardless of the moulding station, it is always desirable to make a cooling station that is sufficiently compact and small to occupy as little of the plant surface as possible.

After cooling, as was already mentioned, the preforms or parisons must be heated again—normally, by placing them on a chain or belt conveyor and feeding them through suitable furnaces—to make them reach a temperature suitable for the blow moulding process; often, said heating furnaces are infrared furnaces.

The drawback of today's infrared furnaces is that they are very large—especially lengthwise—in the case of plants with high production rates, which have a particularly fast chain conveyor speed.

OBJECTS AND BRIEF DESCRIPTION OF THE INVENTION

It is an object of this invention to provide a plant for continuous thermal conditioning of plastic items, especially preforms. Furthermore, this plant must have limited dimensions, especially in terms of minimizing the occupied surface of the manufacturing plant.

In accordance with a first aspect of the invention, this object is achieved by means of a method for thermally conditioning plastic items comprising the following steps:

placing at least one plastic item on a chain conveyor or other continuous conveying device conveying said at least one plastic item through a first thermal conditioning stage and subjecting it/them to a first heating or cooling heat exchange, which produces a significantly greater heat exchange than would result from placing said at least one plastic item in the environment outside said first thermal conditioning stage for the same amount of time;

removing said at least one plastic item from said first thermal conditioning stage and holding it outside said stage for a predetermined amount of time in order to redistribute the temperature inside said at least one plastic item with a predetermined degree of uniformity;

subjecting said at least one plastic item to at least a second heat exchange, which produces a significantly greater heat exchange than would result from placing said at least one plastic item in the environment outside said first thermal conditioning stage for the same amount of time.

In accordance with a second aspect of the invention, the above object is achieved by means of a plant for thermally conditioning plastic items to be blow moulded suitable to implement the above method, where said plant comprises the following:

a chain or other continuous conveying device suitable for conveying at least one plastic item to be thermally conditioned;

a first and second thermal conditioning stage, where each stage is crossed by a length of said chain and is suitable for thermally conditioning by heating and/or cooling said at least one plastic item conveyed on said chain;

where said chain or other continuous conveying device follows a path suitable for feeding said at least one plastic item to be thermally conditioned through said first thermal conditioning stage, removing it from said first heating stage for a predetermined amount of time in order to redistribute the temperature inside said at least one plastic item with a predetermined degree of uniformity, and feeding it through said second thermal conditioning stage.

In accordance with a third aspect of the invention, the above object is achieved by means of a plant for thermally conditioning plastic items to be blow moulded suitable for implementing the method as claimed in claims 1 and/or 2, where said plant comprises:

a chain or other continuous conveying device suitable for conveying at least one plastic item to be thermally conditioned;

at least a first thermal conditioning stage that is crossed by a length of said chain and is suitable for thermally conditioning by heating and/or cooling said at least one plastic item conveyed on said chain;

wherein said chain or other continuous conveying device follows a path suitable for feeding said at least one plastic item to be thermally conditioned through said first thermal conditioning stage, removing said at least one plastic item from said first heating stage for a predetermined amount of time in order to redistribute the temperature inside said plastic item with a predetermined degree of uniformity, and refeeding said at least one plastic item into said first thermal conditioning stage.

In this way, plants for thermally conditioning items can be easily constructed both in the form of heating stations—for example, infrared furnaces—and cooling stations—for example, chambers with forced ventilation—starting from a mechanical structure with many parts in common or at least very similar—for example, the guides and the chain conveyor, and the casing of the furnace or heating unit—allowing the manufacturer of the plants to achieve significant standardization of the components in the two operating modes (i.e. heating and cooling).

This invention makes it possible to make both preform heating and cooling units of quite compact dimensions, in particular in terms of the dimensions of the cooling/heating units and the treadable surface occupied in the plant. Furthermore, this invention can be used to make heating units with furnaces of contained length and cooling units with ventilation tunnels of contained length.

Moreover, the thermal conditioning units—both for heating and cooling the preforms—in accordance with this invention are units that operate in the non sequential but continuous mode. Consequently, they are particularly suited for use with continuous blow moulding plants of preforms that operate at high production rates—where «particularly suited» means that they do not form the bottleneck of the production line; thus, it is possible to make an entire continuous production line of preforms that operates at a high production rate without greatly sacrificing efficiency.

These and other advantages of the invention shall be readily apparent, to experts in the field, from the more detailed description of two particular versions of the invention, given as nonlimiting examples and in conjunction with the accompanying drawings listed below.

DETAILED DESCRIPTION OF THE INVENTION

FIGS. 1-5 show a first embodiment of a plant in accordance with this invention for heating plastic items, especially preforms made of PET for blow moulding bottles or jars.

Figure 1:
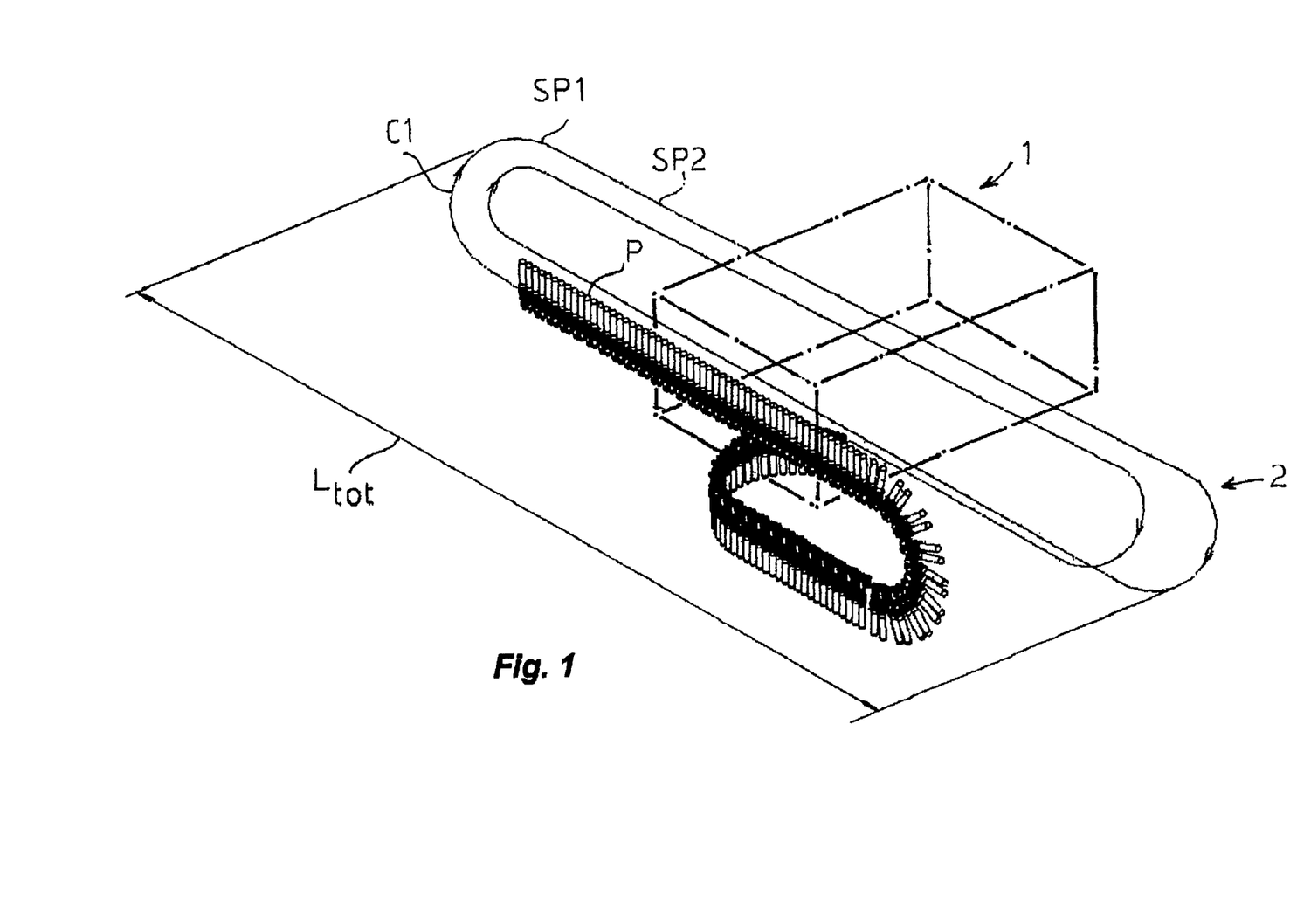
FIGS. 1 and 2 show a schematic, perspective view of the path of the chain conveyor used to feed preforms into a furnace for heating preforms in accordance with a first embodiment of this invention.
Figure 2:
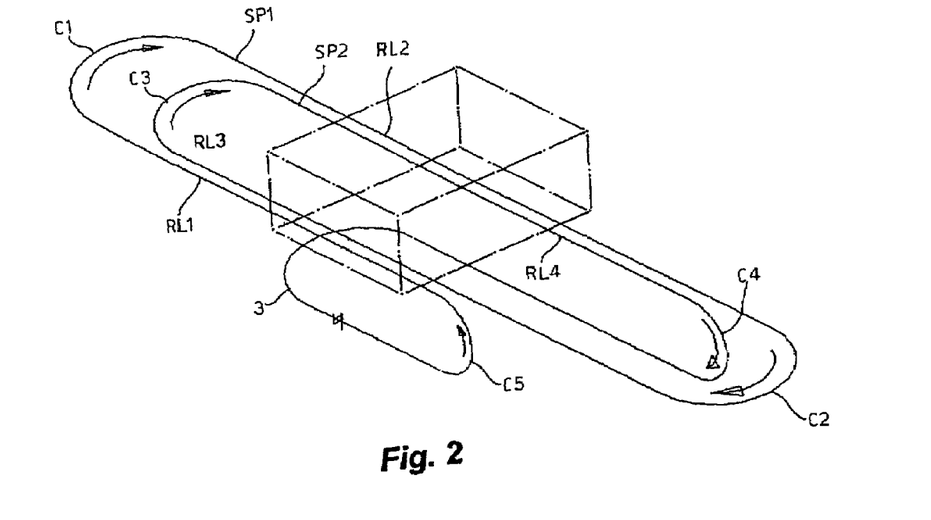

This plant for heating preforms comprises a heating furnace operating with infrared rays 1 and a chain conveyor 2 suitable for feeding many preforms P through said furnace.

Figure 3:
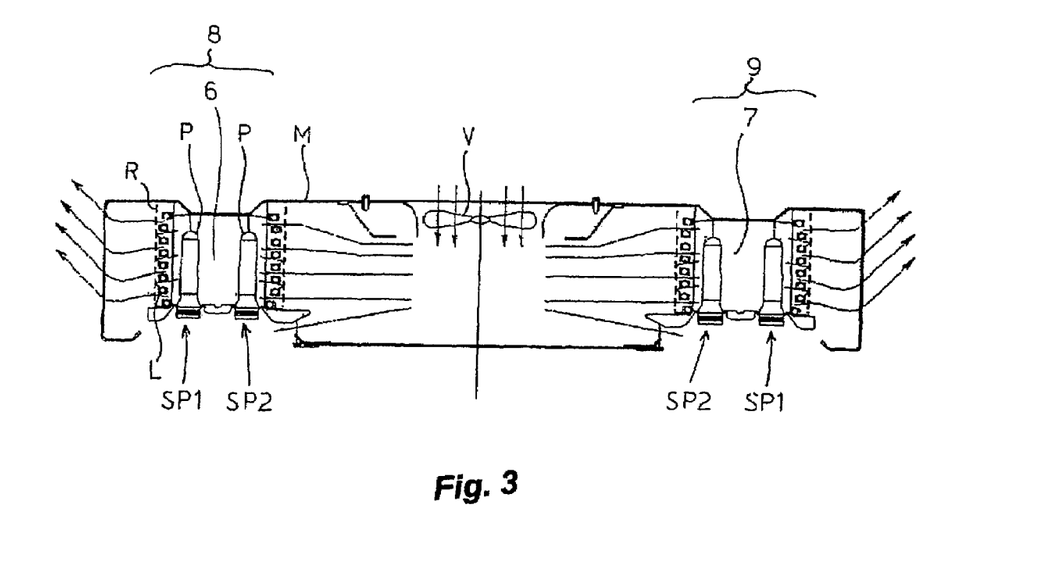
FIG. 3 shows a schematic, crosswise section of the heating furnace depicted in FIG. 1 in accordance with a viewing plane perpendicular to the chain conveyor.
Figure 4:
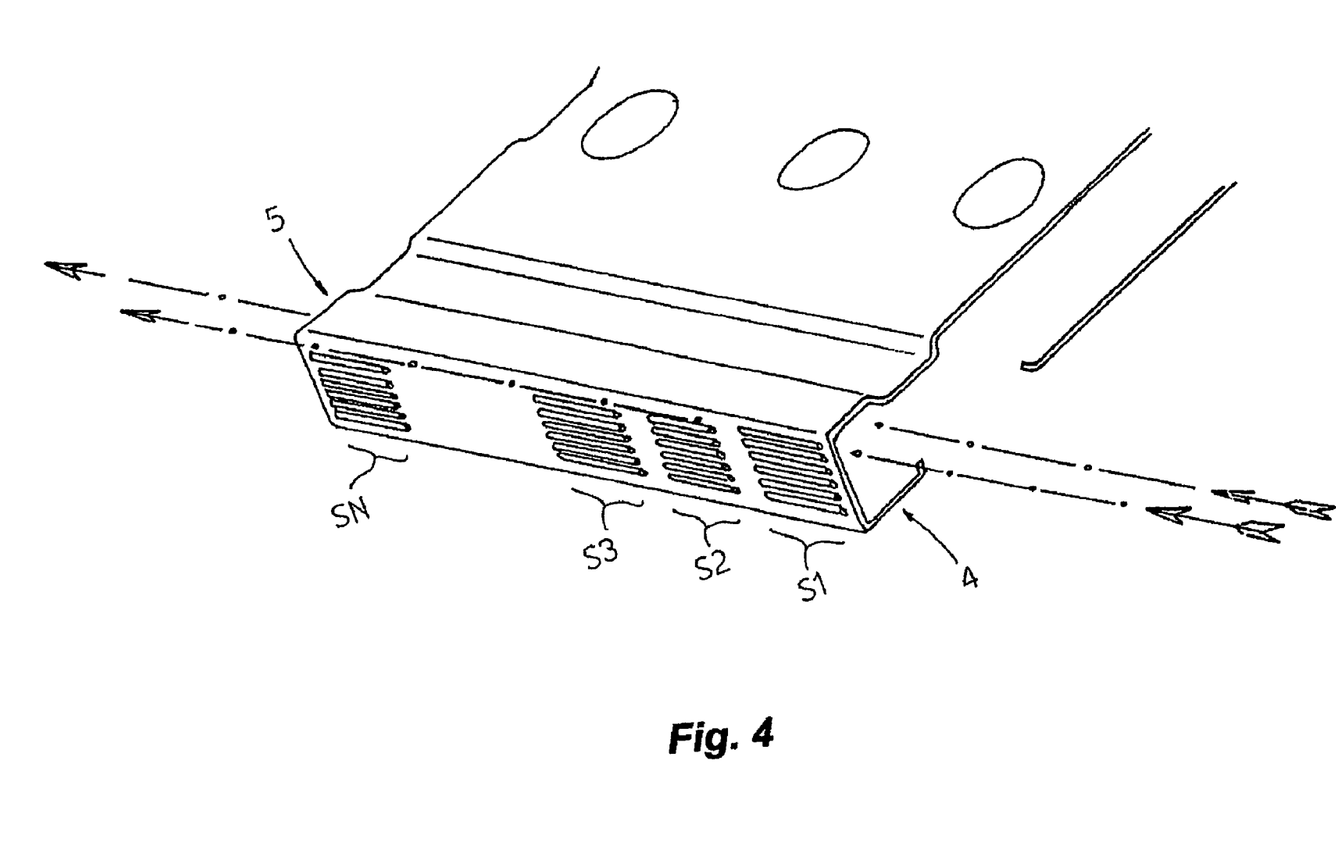
FIG. 4 shows a schematic, perspective view of a detail of the two lengths of the chain inside a heating tunnel of the furnace of FIG. 1.

The furnace 1 may be similar, for example, to the one described in Patent Application WO01/49075 submitted by the Applicant, with the appropriate adaptations resulting from this description. Said furnace, see FIG. 3, comprises the following:

Many infrared lamps L arranged preferably but not necessarily on both sides of the two spirals—as will be explained more in depth further on—of a chain conveyor 2 (not shown in FIG. 3), along one or more tunnels or ducts 6, 7 machined from the inside of the furnace and through which the preforms P to be heated can be fed on the chain conveyor 2 that transports them;

One or more reflecting screens R, placed behind the lamps L, to reflect the infrared rays radiated by the lamps; said screens, as explained more in detail in Patent Application WO01/49075, are preferably perforated to let through an airflow blown by a fan V;

A metal casing M that encloses the lamps L, the reflecting devices R, and the ducts through which the heating air flows.

The preforms—or other items to be heated—are heated in the furnace 1 mainly through radiation and convection.

The infrared lamps L are placed around the chain conveyor 2, along its path, ordered in one or, in general, more vertical columns S1, S2, . . . SN—see FIG. 4—placed beside each other and able to heat a variable length of chain depending on different factors, including the feed rate of the chain 2 and the temperature at which the preforms P must exit the furnace.

The portion of a furnace that heats a section of the chain 2 included between an entry 4 and an exit 5 of the furnace shall be called «heating stage» hereinafter.

FIGS. 1-3 show a particular version of a heating plant in accordance with this invention. In this version, the chain conveyor 2 forms a closed circuit and two spirals SP1, SP2. A preform P to be heated enters the first heating stage 8—see FIG. 3—and is conveyed along a first straight section RL1 of the first spiral SP1—see FIGS. 1, 2—and exits the first heating stage. Then, the preform continues—for example but not necessarily—along another straight section and, then, along a first curve C1 exposed to the external environment, which is located outside the furnace and far away from the infrared lamps or other heating elements. Then, the preform reenters the furnace 1 going through a second heating stage 9—see FIG. 3—and travelling along the second straight section RL2 of the spiral SP1. Once again, the preform P leaves the furnace 1, travels along a second curved section C2, which is also exposed to the external environment outside the furnace and away from the infrared lamps or other heating elements, and reenters the furnace for a third time to travel along the straight section RL3 of the second spiral SP2, which may be but not necessarily more internal to the first spiral SP1.

Then, the preform P goes through the first heating stage 8 again, exits the furnace 1 for a third time, reenters the furnace again after travelling along the curved section C3 of the second spiral SP2, travels along a fourth straight section RL4 through the second heating stage 9, and exits the furnace 1 again. Then, the preform travels along the curved section C4 where the chain drops down from the level of the spirals SP1, SP2 to a lower level—in fact, in this particular example the spirals SP1, SP2 and the curved sections C1-C3 are essentially on a horizontal plane—and reaches the loading/unloading station 3. Here, the preform P to be heated is loaded onto the chain 2 and the preform heated to an appropriate temperature is removed from the chain to proceed to the next blow moulding step, where the preform P is shaped into its final form bottle, pot, or other type of container.

The chain conveyor 2, after passing the loading/unloading station 3, travels along the curved section C5—that may, like the fourth curved section C4, be placed on a vertical plane—rising to the higher level to restart moving another preform P along the first straight section RL1 of the most outward spiral SP1.

Figure 8:
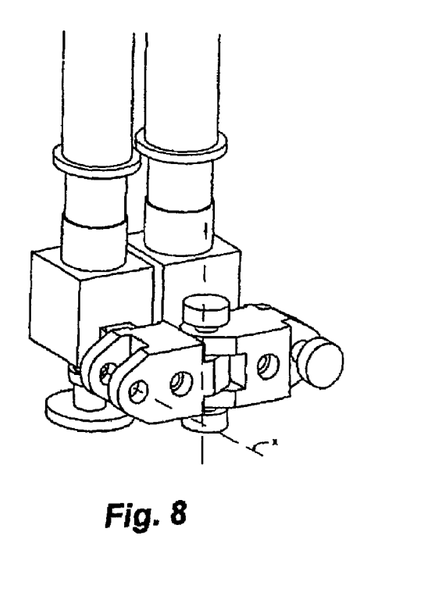
FIG. 8 shows a schematic, perspective view of a detail of the chain of the plants of FIGS. 1 and 6.
Figure 9:
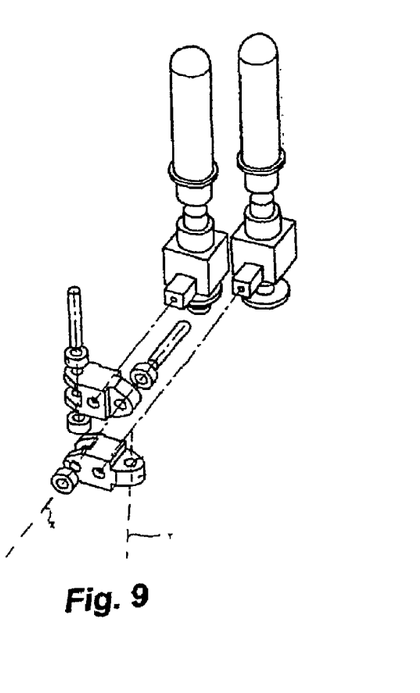
FIG. 9 shows a schematic, exploded view of the chain of FIG. 8.

In order to be able to travel along the curved sections C4, C5 that descend and rise in relation to the level of the two spirals SP1, SP2 forming a path that is essentially non planar, the chain 2 is articulated in such a way that it is able to bend in the three spatial dimensions: an example of a chain with said properties is described in Patent Application WO 99/62693 submitted by the Applicant and is shown schematically in FIGS. 8 and 9.

Figure 5:
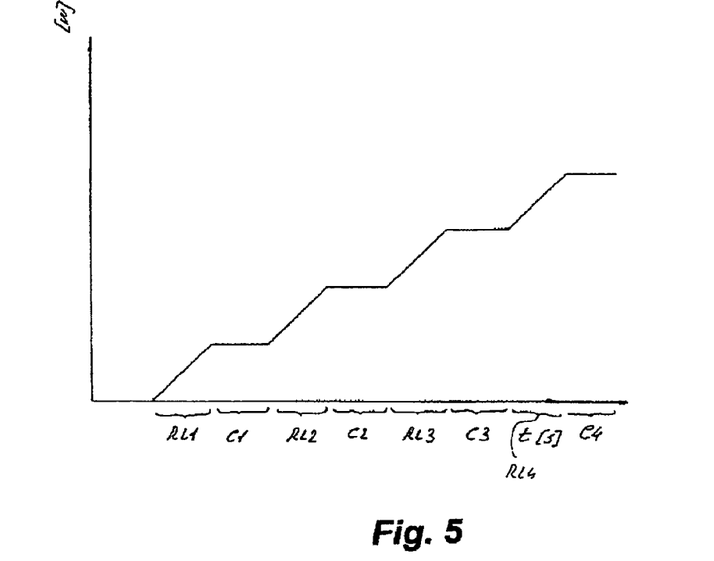
FIG. 5 shows a schematic diagram of a thermal cycle undergone by a preform in the furnace of FIG. 1.

FIGS. 1-4 show a heating plant where each preform P undergoes a thermal cycle, shown schematically in FIG. 5 the abscissas indicate the time or the position of the preform along the path of the chain conveyor 2, while the ordinates indicate the thermal power received or dispensed by the preform in the unit of time: in the straight sections RL1-RL4 inside the furnace—during the four heating stages—the preform P receives thermal energy and heats up; differently, in the curved sections C1-C4, the preform is outside the furnace and is exposed to the external environment or anyhow to an area where more thermal energy is dispersed than is received and, thus, cools down slightly—this is particularly true for the outer layers of the preform, which are hotter, that spread heat by conduction to the inmost layers of the preform, obtaining a more uniform distribution of the thermal energy throughout the thickness.

Thus, the spiral-type path followed by the chain conveyor 2 makes it possible to heat the preforms alternating heating periods in the furnace with periods of «recovery» outside the furnace, preventing the outer layers of the preform from getting excessively hot: in fact, in the infrared heating furnaces, the heat generated in the furnace generally heats by radiation starting from the outer layers of the preform that face the heating elements of the furnace—infrared lamps or reflectors; the preform is also heated by convection from any hot airflows generated in the furnace; then, the heat is propagate by conduction to the inmost layers of the preform. Hence, in said furnaces it is necessary, in general, to adopt adequate measures to avoid overheating excessively the outer layers of the preforms—in fact, overheating could cause undesirable burns or crystallizations of parts of the material of the preform.

Said measures in accordance with this version of the invention consist of alternating heating periods in the furnace with periods of «recovery» outside the furnace, in which the heat received by the surface of the preforms has the time to spread by conduction to the inmost layers of the preform, allowing the temperature of the entire preform to become more uniform.

The spiral path of the chain conveyor makes it possible to realize easily a relatively high number of «recoveries» and thermal homogenization periods without increasing the dimensions of the plant and, in particular, the length of the furnaces. The numerical data of the example described further ahead make this clearer.

FIGS. 1-4 show a version of the invention wherein, advantageously, the different heating stages 8, 9 that the chain 2 goes through are contained in a single furnace 1: this, compared with the case where the different heating stages are found in more than one furnace, minimizes thermal losses of the furnace and maximizes the thermal efficiency of the plant and process.

Advantageously, multiple spirals—two or more—are contained simultaneously and side by side in each heating stage. FIG. 3 shows a version wherein two straight sections of the two spirals SP1 and SP2 are contained side by side in each of the two heating stages. In this preferred version of the invention, furthermore, the infrared lamps R in each heating stage are placed on both sides of the two spirals SP1, SP2 in order to make the heating of the preforms more uniform and prevent the PET from crystallizing on one side of said preforms in spite of increasing—compared with a furnace where the lamps are placed on only one side of the two spirals SP1, SP2—the radiation power for every linear metre of the chain and reducing the thermal dispersions of the plant.

Advantageously, the straight sections RL1, RL3 and RL2, RL4 of the two spirals SP1, SP2 are placed side by side in the different ducts or tunnels 6, 7 of the furnace so that the preforms P fastened to these are arranged in an essentially quincunx layout: this layout makes the lamps on each side of the heating duct of the furnace radiate the preforms on both the spirals that pass in front, preventing the different preforms from shading each other and optimizing the energy efficiency of the furnace.

EXAMPLE

To illustrate this invention better, an example is given with numerical data relating to a plant realized by the Applicant in accordance with the version of the invention shown in FIGS. 1-4.

In said plant, the chain conveyor 2 forms a path with two spirals SP1, SP2 entering and exiting—as in FIG. 2—a single furnace 1 four times. The fact that the two chain spirals SP1, SP2 pass in two ducts 8, 9 reduces the thermal losses of the furnace, bringing its thermal efficiency—defined as the relation between the thermal energy required to bring a certain quantity of preforms from the starting temperature to the desired temperature, and the energy consumed by the furnace—indicatively, up to approximately 21-28%, against 15-20% for known types of infrared furnaces for example, a furnace of the type described in WO0149075 with only one duct. The greater efficiency of the furnace made it possible to realize the total path of the preforms in front of the IR lamps approximately 0.7 times longer than the corresponding paths in a furnace of the type described in WO0149075, obtaining a shorter furnace 1.

Furthermore, the fact that the two spirals SP1, SP2 are placed side by side in each duct, made it possible to half the total length of the ducts in front of the infrared lamps: thus, the total length of duct in front of the infrared lamps is reduced indicatively by 0.7×0.5=0.35, i.e. it is reduced by about two thirds the one of a furnace of the type described in WO01/49075.

The above data are purely indicative: in some cases, in order not to risk a too strong exposure of the preforms to infrared rays—with the consequent crystallization of their outer surface—it may be necessary to reduce the thermal power by unit of length and, thus, to maintain the required total power, increase the length of the furnace slightly. Indicatively, anyhow, it can be estimated that with this invention it is possible at least to half the total dimensions in length $L_{TOT}$, FIG. 1, of the station for heating preforms compared with the length of a furnace built in accordance with the instructions of WO01/49075.

Figure 6:
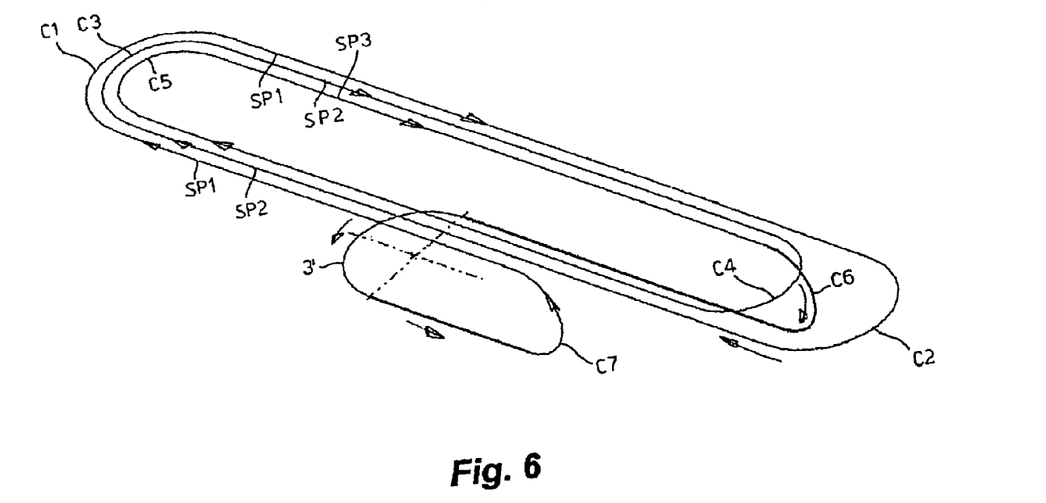
FIG. 6 shows a schematic, perspective view of the path of the chain conveyor used to feed preforms into a plant for cooling preforms in accordance with a second embodiment of this invention.
Figure 7:
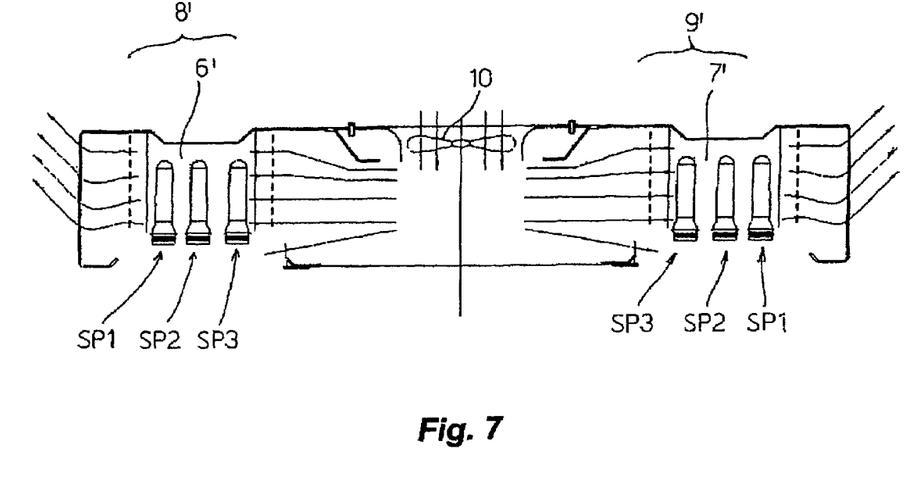
FIG. 7 shows a schematic, transversal section of the cooling plant of FIG. 6 in accordance with a viewing plane perpendicular to the chain conveyor.

FIGS. 6, 7 show a second version of a plant for cooling plastic items, especially preforms, in accordance with this invention.

This plant comprises a ventilation cooling unit 1' and a preform chain conveyor 2'.

The ventilation cooling unit—hereinafter referred to as «ventilation unit 1'» comprises the following:

- A metal casing that defines air intakes and ducts through which the fresh air suctioned by the fans 10—fastened to the casing—is conveyed to the preforms P to be cooled (see FIG. 7);
- One or more ducts 8', 9' through which the preform chain conveyor 2' can pass.

In accordance with the preferred version of the invention, many cooling holders, for example of the type described in the aforementioned Patent Application WO 02/074518 submitted by the Applicant, are attached to the chain: each holder comprises a housing for a preform to be cooled; the housing is made in order to cool the preform by thermal conduction and hold it appropriately in order to prevent or minimize thermal deformations during cooling. Each holder can be equipped with appropriate cooling fins that speed up the heat exchange between the holder and the cooling airflow produced by the ventilation unit 1.

In the cooling plant shown in FIGS. 6 and 7, the preform chain conveyor 2' follows a path with three spirals SP1, SP2, SP3 that brings each preform P inside and outside the furnace 1' six times.

The chain 2' descends to a lower level following the curved section C6—found, for example, in a vertical or slanted plane—and travels along the loading/unloading area 3' analogous to the unloading area 3 of the plant shown in FIG. 2. Then, it rises to the top level of the three spirals SP1, SP2, SP3 following the ascending curved section C7.

Inside the furnace 2', the three spirals SP1, SP2, SP3 are placed side by side in the two ducts 8', 9': placing more than one spiral of the chain 2' side by side in a same duct, it is possible to optimize operation, the efficiency, and adjustment of the fan 10 or fans 10.

In the case of a unit exclusively for cooling, the version shown in FIGS. 6 and 7 forms a continuous rather than sequential cooling unit, and can be connected to a continuous moulding station more efficiently, in terms of the production rate of the line, than a sequential cooling station. The path of the chain conveyor, with concentric spirals that are placed side by side in a same cooling tunnel, makes it possible to realize the station with relatively contained dimensions and occupy a compact surface in the manufacturing plant.

The above described versions can undergo numerous modifications and variants while remaining within the scope of this invention: more generally, in accordance with this invention, the chain 2, 2' or other continuous conveying device follows a path suitable for feeding at least a plastic item to be heated and/or cooled—and not only a preform P—through a first heating or cooling conditioning stage where the preform exchanges more heat than would result from placing said plastic item(s) in the environment outside said first thermal conditioning stage for the same amount of time; removing said plastic item(s) from said first thermal conditioning stage for a predetermined amount of time in order to redistribute the temperature inside the plastic item with a predetermined degree of uniformity; and feeding said plastic item(s) through a second thermal conditioning stage. The chain conveyor may follow a closed path without the spirals but, for example, in the shape of a simple ring and may go through the same heating stage several times or may go through several heating stages in different furnaces rather than in the same furnace 1. The heating furnaces need not be infrared furnaces: they may be furnaces with electric resistors or another kind of heating elements. The number of spiral sections that are placed side by side in a same duct 6, 7, 6', 7' can vary from 1 to a generic number «N» of spiral sections. The cooling unit 1' need not be a convection type cooling unit with forced air: it may be of another type—for example, a spray or immersion cooling unit.

This invention also applies to any versions, changes, and variants that fall within the scope of the claims and are similar in type.

The invention claimed is:

1. A plant for thermally conditioning moulded plastic items for use in blow mould plants comprising:
   - a chain or other continuous conveying device forming a spiral-type path suitable for conveying at least one plastic item;
   - at least one duct through which said at least one plastic item can be conveyed and that is crossed by a length of said chain or other continuous conveying device and is suitable for carrying out at least a first thermal conditioning stage on said at least one plastic item;
   - wherein said chain or other continuous conveying device defines a path comprising a feeding section for feeding said at least one plastic item through said at least a first thermal conditioning stage, a removing section for removing said at least one plastic item from said at least a first thermal conditioning stage for a predetermined amount of time in order to redistribute the temperature inside said at least one plastic item with a predetermined degree of uniformity, and a refeeding section for refeeding said at least one plastic item into said at least a first thermal conditioning stage,
   - wherein said at least one duct is crossed by at least two sections, of said chain or other continuous conveying device, placed side by side, wherein said at least two sections belong each to a different spiral of said chain or other continuous conveying device.

2. A plant as claimed in claim 1 comprising at least a heating element suitable for heating by radiation plastic items arranged on at least two sections of said chain, each belonging to a different spiral of said chain, when said plastic items pass side by side in at least one of said ducts.

3. A plant as claimed in claim 2 wherein said chain or other continuous conveying device is suitable for feeding said at least one plastic item to be thermally conditioned through said first and a second thermal conditioning stages.

4. A plant as claimed in claim 2, wherein said spirals are substantially placed one inside the other.

5. A plant as claimed in claim 3, wherein said chain or other continuous conveying device forms a closed path.

6. A plant as claimed in claim 5 wherein said chain or other continuous conveying device is articulated in order to be able to bend in the three spatial dimensions and forms essentially a non planar path.

7. A plant as claimed in claim 6 wherein the at least one plastic item is a plurality of preforms and said at least two chain sections are equipped with a plurality of fastenings suitable for housing a plurality of preforms, and said at least two sections pass side by side through said at least one duct whereby the preforms are arranged in an essentially quincunx layout.

8. A plant as claimed in claim 7, wherein said first and second thermal conditioning stages can be heating or cooling stages.

9. A plant as claimed in claim 8, wherein the plant comprises one or more heating furnaces suitable for heating said preforms during said first and second thermal conditioning stages.

10. A plant as claimed in claim 9, wherein the plant comprises cooling stations suitable for cooling said at least one plastic item, during said first and second thermal conditioning stages, more than would result from placing said at least one plastic item in the environment outside said first and second thermal conditioning stages.

11. A plant as claimed in claim 9 comprising a heating furnace where said first and second thermal conditioning stages both take place in said furnace.

12. A plant as claimed in claim 10 comprising a cooling station and where said first and second thermal conditioning stages both take place in said cooling station.

\* \* \* \* \*